United States Patent
Colucci et al.

(10) Patent No.: US 6,880,939 B2
(45) Date of Patent: Apr. 19, 2005

(54) METHODS AND SYSTEMS FOR PROJECTING IMAGES AT GREATER THAN 180 DEGREES

(75) Inventors: D'nardo Colucci, Minneapolis, MN (US); Raymond L. Idaszak, Apex, NC (US); Richard W. Zobel, Jr., Raleigh, NC (US); Suresh Balu, Chapel Hill, NC (US); David McConville, Asheville, NC (US)

(73) Assignee: Elumens Corporation, Durham, NC (US)

( * ) Notice: Subject to any disclaimer, the term of this patent is extended or adjusted under 35 U.S.C. 154(b) by 120 days.

(21) Appl. No.: 10/109,385

(22) Filed: Mar. 28, 2002

(65) Prior Publication Data

US 2002/0141053 A1 Oct. 3, 2002

Related U.S. Application Data

(60) Provisional application No. 60/279,912, filed on Mar. 29, 2001.

(51) Int. Cl.$^7$ ............................................... G03B 21/14
(52) U.S. Cl. ......................................... 353/122; 353/69
(58) Field of Search .......................... 353/69, 70, 122; 359/451, 662, 680, 749, 725; 352/69

(56) References Cited

U.S. PATENT DOCUMENTS

| | | | |
|---|---|---|---|
| 2,280,206 A | | 4/1942 | Waller et al. ............... 88/16.2 |
| 3,469,837 A | | 9/1969 | Heilig ............................ 272/8 |
| 4,322,124 A | * | 3/1982 | Padgitt et al. ............... 250/353 |
| 5,473,474 A | | 12/1995 | Powell ....................... 359/725 |
| 5,762,413 A | | 6/1998 | Colucci et al. ............. 353/122 |
| 6,115,193 A | * | 9/2000 | Shu ............................ 359/725 |
| 6,327,020 B1 | * | 12/2001 | Iwata ........................... 352/69 |

FOREIGN PATENT DOCUMENTS

| | | | |
|---|---|---|---|
| WO | WO 00/28353 | 5/2000 | ............ G02B/3/00 |

OTHER PUBLICATIONS

PCT International Search Report for PCT/US 02/09706 dated Feb. 27, 2003.

* cited by examiner

Primary Examiner—William C. Dowling
(74) Attorney, Agent, or Firm—Myers Bigel Sibley & Sajovec

(57) ABSTRACT

An optical projection system includes an image source that is configured to generate an array of image pixels. A lens assembly is configured to project the array of image pixels onto a hemispherical surface at a projection angle greater than 180°. The lens assembly may include a wide-angle lens assembly and an image relay lens assembly that is configured to reduce dispersion in the array of image pixels between the image source and the wide-angle lens assembly. The wide-angle lens assembly may include a meniscus lens assembly and a wavefront shaping lens assembly. The lens assembly may be further configured to project the array of image pixels onto the hemispherical surface such that there is a constant angular separation between adjacent image pixels. An optical projection system may also include two image sources that are configured to generate first and second arrays of image pixels and two lens assemblies that are configured to respectively project the first and second arrays of image pixels at projection angles that are greater than 180° onto a surface in opposite directions of each other. The combination of the first and second arrays of image pixels may cover a continuous, 360° portion of the hemispherical surface.

34 Claims, 4 Drawing Sheets

METHODS AND SYSTEMS FOR PROJECTING IMAGES AT GREATER THAN 180 DEGREES

CROSS-REFERENCE TO PROVISIONAL APPLICATION

This application claims the benefit of Provisional Application Ser. No. 60/279,912, filed Mar. 29, 2001, entitled *Methods and Systems for Projecting Images at Greater than 180 Degrees,* the disclosure of which is hereby incorporated herein by reference.

BACKGROUND OF THE INVENTION

The present invention relates to optical projection systems and methods, and, more particularly, to hemispherical optical projection systems and methods.

Immersive virtual environments have many applications in such fields as simulation, visualization, and space design. A goal of many of these systems is to provide the viewer with a full sphere (180°×360°) of image. In achieving this goal, there is traditionally a trade-off between complexity and cost. Fully immersive systems using rear projection typically use multiple projections placed around the display surface. These systems, however, may require significant alignment and upkeep, including edge blending and color matching. They also may be expensive and may require a room that is on average twice as big as the display surface. Multi-projector front projection environments typically do not require the extra room of rear projection environments, but generally can not achieve the same level of immersion and still may suffer the same cost and alignment problems. Single projector, front projection environments may be lower cost and may also be more readily aligned, but these systems may not provide the user with greater with a 170° field of view (FOV) because the viewer may need to be located behind the projector. For example, as shown in FIG. 1, a viewer that is located behind a projector with an angle of projection of approximately 170° achieves an effective FOV of approximately 125°.

SUMMARY OF THE INVENTION

According to some embodiments of the present invention, an optical projection system comprises an image source that is configured to generate an array of image pixels. A lens assembly is configured to project the array of image pixels onto a surface at a projection angle greater than 180°. This may allow a viewer located behind the optical projection system to achieve a full hemispherical field of view, i.e., at least a 180° field of view.

The lens assembly may be further configured to project the array of image pixels onto the surface such that there is a constant angular separation between adjacent projected pixels. Moreover, the lens assembly may project the array of image pixels onto surfaces, such as hemispherical surfaces, of varying radii.

In various embodiments of the present invention, the image source may comprise a cathode ray tube, a field emitter array, and/or any other two-dimensional image array. The image source may also comprise a digital light processing (DLP) unit, a liquid crystal display (LCD) unit, and/or a liquid crystal on silicon (LCOS) unit.

In still other embodiments of the present invention, the lens assembly may comprise a wide-angle lens assembly and an image relay lens assembly that is configured to optically relay the array of image pixels between the image source and the wide-angle lens assembly. In particular embodiments of the present invention, the wide-angle lens assembly may comprise a diffractive optical element that is configured to provide both color correction and higher order wavefront shaping.

In further embodiments of the present invention, the optical projection system may comprise a dome that has an inner surface. The lens assembly may be configured to project the array of image pixels onto the inner surface of the dome at a projection angle greater than 180°.

To provide an immersive effect, for example, other embodiments of the present invention may comprise two image sources that are configured to generate first and second arrays of image pixels and two lens assemblies that are configured to respectively project the first and second arrays of image pixels at projection angles that are greater than 180° onto a surface in opposite directions of each other. The combination of the first and second arrays of image pixels may cover a continuous, 360° portion of the hemispherical surface.

Although described primarily above with respect to system and/or apparatus embodiments of the present invention, it should be understood that the present invention may be embodied as methods of optical projection.

BRIEF DESCRIPTION OF THE DRAWINGS

Other features of the present invention will be more readily understood from the following detailed description of specific embodiments thereof when read in conjunction with the accompanying drawings, in which.

DETAILED DESCRIPTION OF PREFERRED EMBODIMENTS

Figure 1:
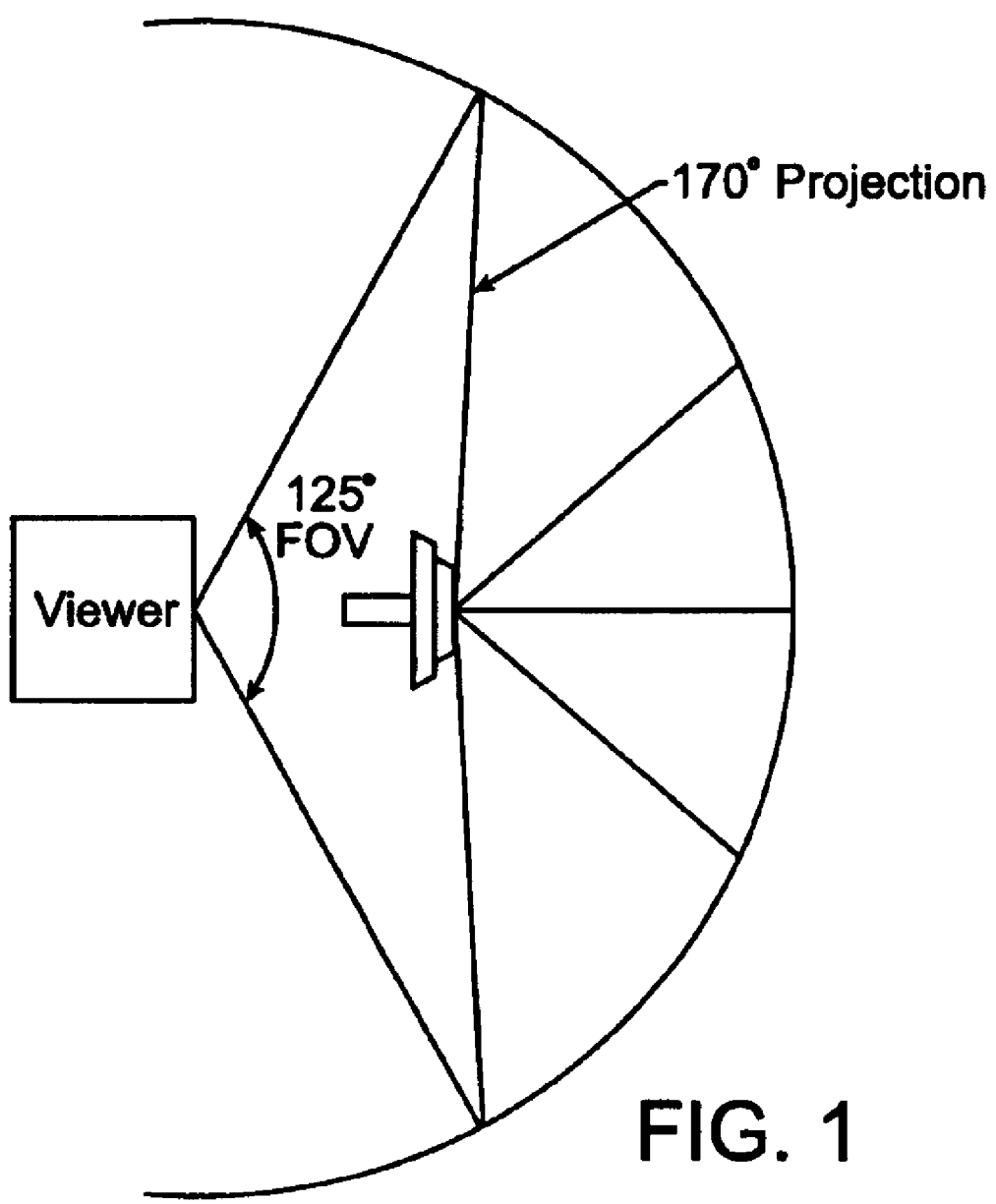
FIG. 1 is a diagram that illustrates a conventional optical projection system that projects an array of image pixels at an angle of projection less than 180°.

While the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention as defined by the claims. Like reference numbers signify like elements throughout the description of the figures.

Figure 2A:
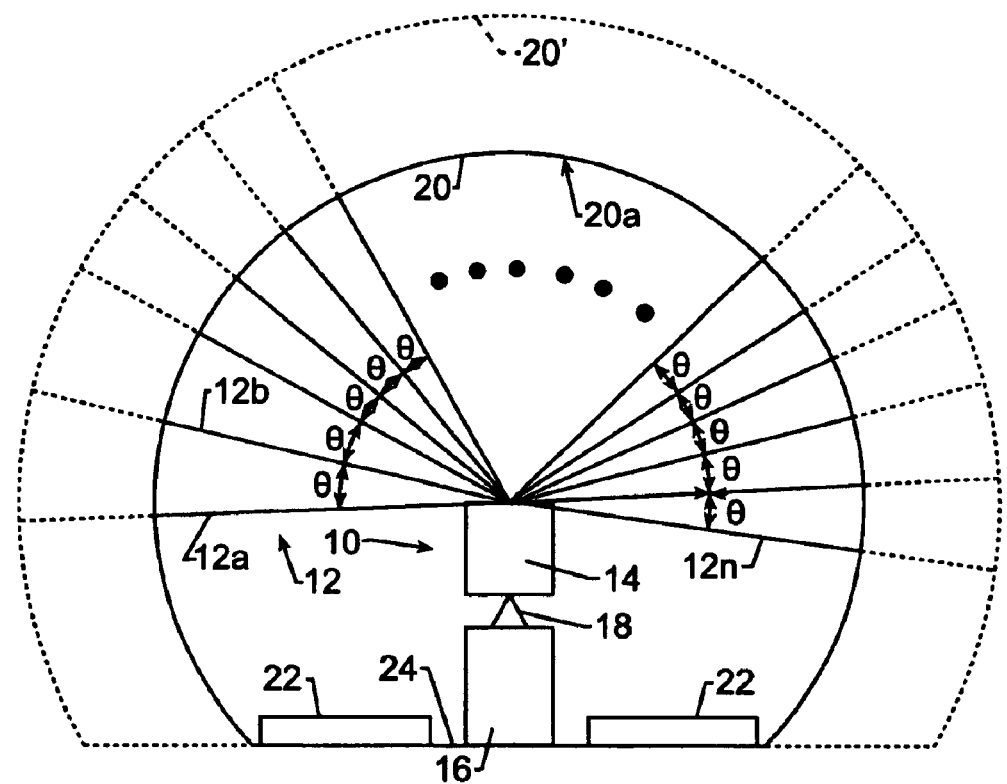
FIGS. 2A and 2B are block diagrams that illustrate optical projection systems and methods for projecting an array of image pixels at an angle of projection greater than 180° in accordance with some embodiments of the present invention.
Figure 2B:
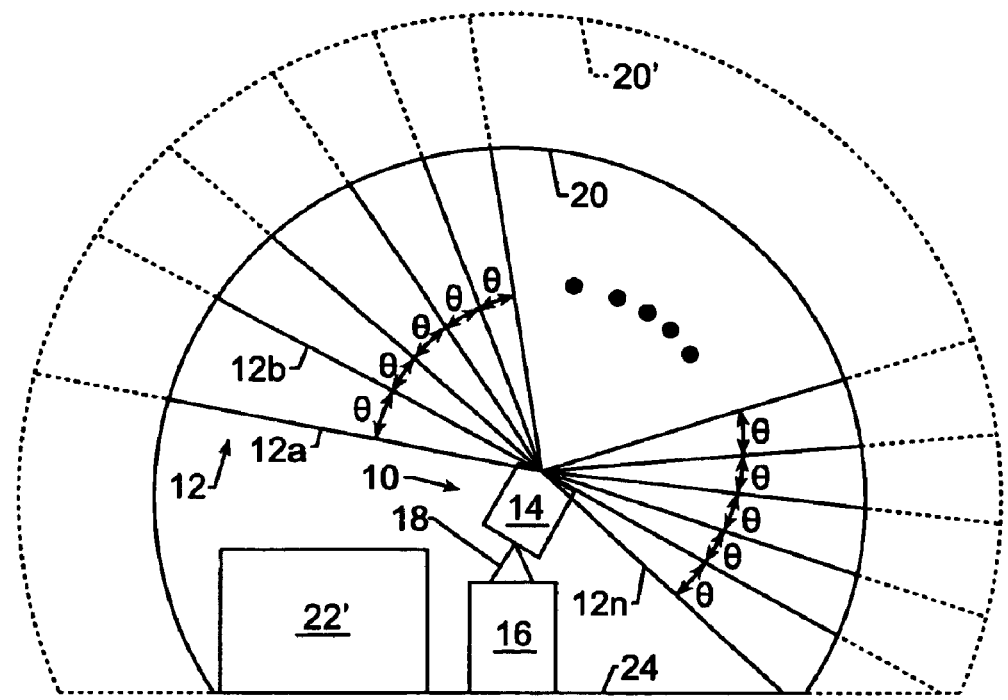

Referring now to FIGS. 2A and 2B, a tiltable optical projection system having constant angular separation of projected pixels, according to some embodiments of the present invention, will now be described. An optical projection system 10 projects an array of image pixels 12 having constant angular separation among adjacent pixels as indicated by the angle θ, which is constant among adjacent pixels 12a–12n. Moreover, the optical projection system 10 is configured to project the array of image pixels 12 at a projecting angle greater than 180°. As shown in FIGS. 2A and 2B, the optical projection system 10 projects the array of image pixels 12 having constant angular separation onto the inner surface 20a of a truncated hemispherical dome 20. The greater than 180° optical projection system 10 may be referred to as an F-θ inverse telephoto lens, where f is the focal length of the lens and θ is the angle of projection. Although embodiments of the present invention are illustrated herein in the context of projecting image pixels onto a hemispherical surface, it will be understood that any screen surface may be used, including, but not limited to, hyper-hemispherical surfaces and elliptical surfaces.

By maintaining constant angular separation among adjacent pixels, a low distortion image may be projected by the optical projection system 10 onto domes of varying radii, which is illustrated by surface 20'. Domes of radii from 4 to 8 meters may be accommodated in accordance with some embodiments of the present invention. To maintain low distortion with constant angle of separation, the optical projection system 10 may be mounted at the center of the inner dome surface 20a so as to radially project the array of image pixels 12 onto the inner dome surface.

Still referring to FIGS. 2A and 2B, some embodiments of the optical projection system 10 also comprise means for tilting or aiming the array of image pixels 12 so that the optical projection system 10 projects the array of pixels onto a plurality of selectable positions on the inner dome surface 20a. For example, as shown in FIGS. 2A and 2B, the projecting optics 14 may be pivotally mounted on a base 16 using a pivot 18. The base 16 is located on the floor 24 of the dome 20. The pivot 18 may allow pivoting within a plane or in multiple planes. The design of the pivot 18 is generally known to those skilled in the art and need not be described further herein.

By incorporating tilting or aiming means, the optical projection system 10 may project vertically upward in a planetarium projection as shown in FIG. 2A or may project at an angle (for example 45 degrees) from vertical in a theater projection position, as shown in FIG. 2B. Typically, when projecting in a planetarium style as shown in FIG. 2A, the audience area 22 surrounds the projection system 10. In contrast, when projecting theater style, the audience area 22' is typically behind the optical projection system 10 and the audience area 22' is raised so that the audience can see the entire field of view in front of them. Thus, different audience configurations may be accommodated.

The dome 20 may be constructed for portability and easy of assembly and disassembly. Exemplary embodiments of the dome 20 are described in U.S. Pat. No. 5,724,775, entitled "Multi-Pieced, Portable Projection Dome and Method of Assembling the Same" and assigned to the assignee of the present application, the disclosure of which is hereby incorporated herein by reference.

Figure 3:
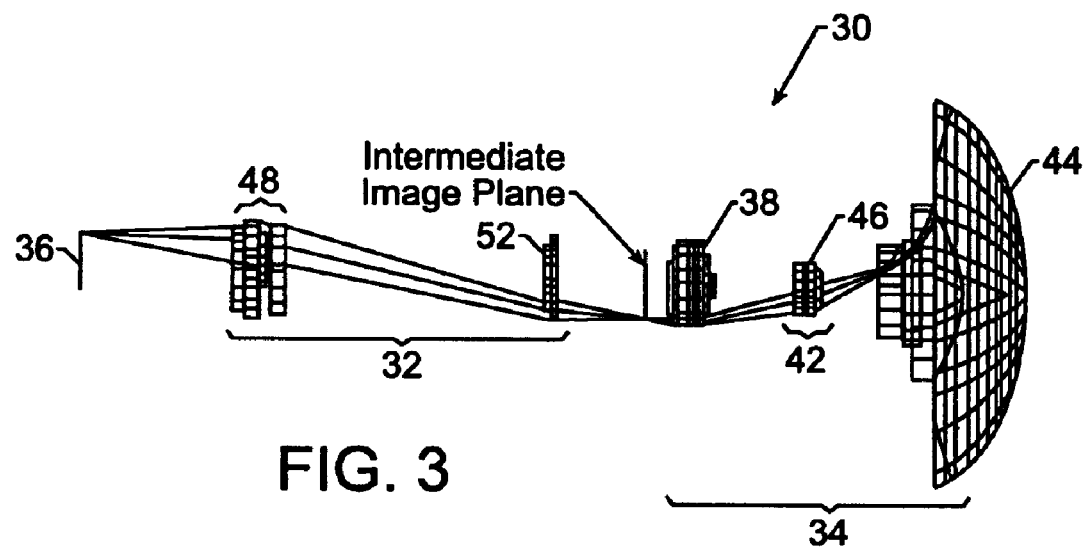
FIG. 3 is a schematic diagram that illustrates embodiments of an image source and lens assembly that may be used in optical projection systems and methods for projecting an array of image pixels at an angle of projection greater than 180° in accordance with some embodiments of the present invention.

Referring now to FIG. 3, a lens assembly 30 that may be used in the optical projection system 10 to project an array of image pixels at a projection angle greater than 180°, in accordance with some embodiments of the present invention, will now be described. The lens assembly 30 comprises an image relay lens assembly 32 and a wide-angle lens assembly 34 that are positioned in a path of an array of image pixels. The lens assembly 30 is configured such that the array of image pixels may be projected at a projection angle greater than 180°. The array of image pixels is generated by an image source 36. In accordance with various embodiments of the present invention, the image source 36 may be a cathode ray tube, a field emitter array, or any other two-dimensional image array. The image source may also comprise a digital light processing (DLP) unit, a liquid crystal display (LCD) unit, and/or a liquid crystal on silicon (LCOS) unit. The array of image pixels may be formed by a single light path for projecting gray scale images, a single light path for projecting color images, or by combining separated red, green, and blue light paths as described in U.S. Pat. No. 5,762,413 (hereinafter "'413 patent"), entitled "Tiltable Hemispherical Optical Projection Systems and Methods Having Constant Angular Separation of Projected Pixels" and assigned to the assignee of the present application, the disclosure of which is hereby incorporated herein by reference.

The wide-angle lens assembly 34 comprises a lens assembly 38, a wavefront shaping lens assembly 42, and a meniscus lens assembly 44. The wavefront shaping lens assembly 42 may comprise a diffractive optical element 46 that may allow for color correction and/or higher order wavefront shaping based on the field of view to be provided. Exemplary embodiments of the wavefront shaping lens assembly 42, and the meniscus lens assembly 44 are described in detail in the '413 patent.

Conventional inverse telephoto projection systems may exhibit the general characteristic that the back focal distance, (i.e., the farthest distance between a lens in the lens assembly and the image source) is longer than the effective focal length (i.e., the focal length of a theoretical single element lens having the same optical characteristics as the lens assembly) because of space occupied by optical and mechanical components. Advantageously, in accordance with some embodiments of the present invention, the image relay lens assembly 32, comprising lenses 48 and 52, may optically relay the array of image pixels between the image source 36 and the wide-angle lens assembly 34. The dispersion in the array of image pixels at an intermediate image plane near the wide angle lens assembly 34 is similar to the dispersion in the array of image pixels near the image source 36. Advantageously, this may allow the conflict between back focal distance and effective focal length to be reduced.

Figure 4:
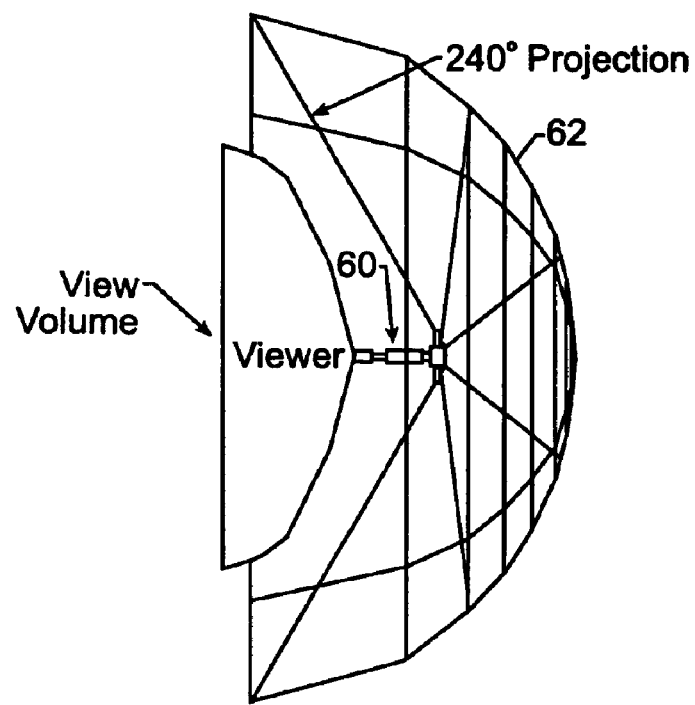
FIG. 4 is a diagram that illustrates an optical projection system, according to some embodiments of the present invention, projecting an array of image pixels at an angle of projection of 240° to provide a viewer with a full hemispherical field of view.

Referring now to FIG. 4, an optical projection system 60, in accordance with some embodiments of the present invention, is illustrated as projecting an array of image pixels onto an inner surface of a hemispherical dome structure 62 at a projection angle greater than 180°. The optical projection system 60 may be implemented as discussed above with respect to FIGS. 2 and 3. As shown in FIG. 4, the optical projection system 60 projects the array of image pixels at a projection angle of approximately 240°. Advantageously, this may allow a viewer located behind the optical projection system 60 to achieve a full hemispherical field of view, i.e., at least a 180° field of view.

Figure 5:
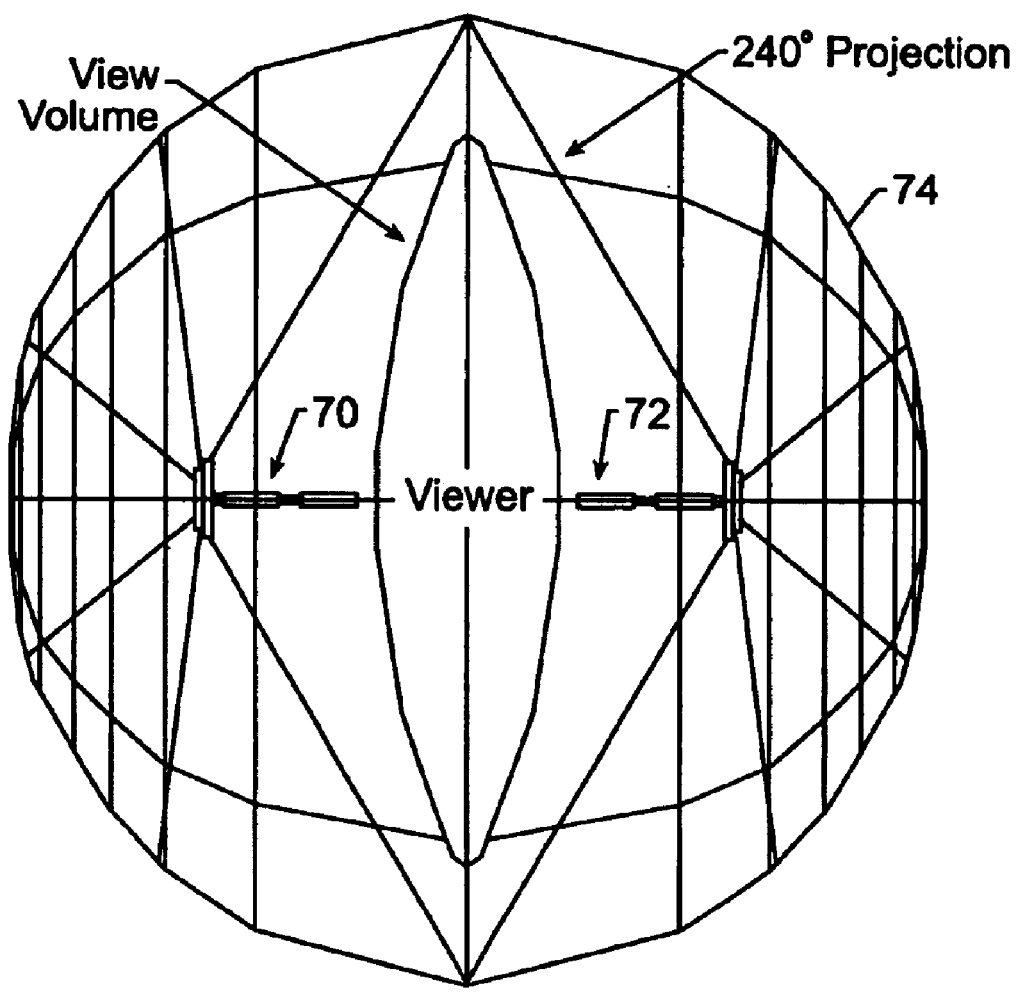
FIG. 5 is a diagram that illustrates an optical projection system, according to some embodiments of the present invention, incorporating dual image sources and lens assemblies projecting arrays of image pixels at an angle of projection of 240° to provide a viewer with a 360° field of view.

In other embodiments of the present invention illustrated in FIG. 5, two optical projection systems 70 and 72, each of which may be implemented as discussed above with respect to FIGS. 2 and 3, are configured to project first and second arrays of image pixels onto the inner surface of a hemispherical dome structure 74 at respective projection angles greater than 180°. As shown in FIG. 5, each optical projection system 70 and 72 projects a respective array of image pixels at a projection angle of approximately 240°. The combination of the first and second arrays of image pixels projected by the optical projection systems 70 and 72 covers a continuous, 360° portion of the hemispherical inner surface of the dome structure 74. Advantageously, this may allow a viewer located between the two optical projection systems 70 and 72 to achieve a full 360° field of view without casting a shadow.

In some embodiments of the present invention illustrated in FIGS. 4 and 5, one or more of the optical projection systems 60, 70 and 72 may respectively project an array of image pixels at a horizontal projection angle greater than 180° and a vertical projection angle of approximately 165°. Such projection may make efficient use of a 4:3 image aspect ratio often used in video presentations.

Many variations and modifications can be made to the preferred embodiments without substantially departing from the principles of the present invention. All such variations and modifications are intended to be included within the scope of the present invention, as set forth in the following claims.

We claim:

1. An optical projection system, comprising:
   an image source that is configured to generate an array of image pixels;
   a lens assembly that is configured to project the array of image pixels onto a surface at a projection angle greater than 180 degrees, the lens assembly comprising:
      a wide angle lens assembly; and
      an image relay lens assembly that is between the image source and the wide angle lens assembly and is configured to maintain a dispersion in the array of image pixels at an intermediate image plane that is substantially the same as a dispersion in the array of image pixels at the image source.

2. The optical projection system of claim 1, wherein the lens assembly is further configured to project the array of image pixels onto the surface such that there is a constant angular separation between adjacent projected pixels.

3. The optical projection system of claim 1, wherein the surface is a hemispherical surface.

4. The optical projection system of claim 3, wherein the lens assembly is further configured to project the array of image pixels onto hemispherical surfaces of varying radii.

5. The optical projection system of claim 1, wherein the image source comprises a cathode ray tube.

6. The optical projection system of claim 1, wherein the image source comprises a field emitter array.

7. The optical projection system of claim 1, wherein the image source comprises a unit selected from the group of units consisting of a digital light processing unit, a liquid crystal display unit, and a liquid crystal on silicon unit.

8. The optical projection system of claim 1, wherein the wide angle lens assembly comprises:
   a diffractive optical element that is configured to provide color correction and higher order wavefront shaping.

9. The optical projection system of claim 1, further comprising:
   a dome that comprises an inner surface; and
   wherein the lens assembly is further configured to project the array of image pixels onto the inner surface of the dome at a projection angle greater than 180 degrees.

10. The optical projection system of claim 1, further comprising:
    means for aiming the array of image pixels at a selectable portion of the surface.

11. An optical projection system, comprising:
    a first image source that is configured to generate a first array of image pixels;
    a first lens assembly comprising a first wide angle lens assembly and a first image relay lens assembly that is between the first image source and the wide angle lens assembly that are configured to project the first array of image pixels onto a surface at a projection angle greater than 180 degrees in a first direction, the first image relay lens assembly being further configured to maintain a dispersion in the first array of image pixels at a first intermediate image plane that is substantially the same as a dispersion in the first array of image pixels at the first image source;
    a second image source that is configured to generate a second array of image pixels; and
    a second lens assembly comprising a second wide angle lens assembly and a second image relay lens assembly that is between the second image source and the wide angle lens assembly that are configured to project the second array of image pixels onto the surface at a projection angle greater than 180 degrees in a second direction, opposite the first direction, the second image relay lens assembly being further configured to maintain a dispersion in the second array of image pixels at a second intermediate image plane that is substantially the same as a dispersion in the second array of image pixels at the second image source.

12. The optical projection system of claim 11, wherein a combination of the first array of image pixels and the second array of image pixel covers a continuous, 360 degree portion of the surface.

13. The optical projection system of claim 11, wherein the first and second lens assemblies are further configured to project the first and second arrays of image pixels onto the surface such that there is a constant angular separation between adjacent projected pixels.

14. A method of projecting an image, comprising:
    optically relaying an array of image pixels between an image source and a wide-angle lens assembly so as to maintain a dispersion in the array of image pixels at an intermediate image plane that is substantially the same as a dispersion in the array of image pixels at the image source; and
    projecting the array of image pixels onto a surface from the wide-angle lens assembly at a projection angle greater than 180 degrees.

15. The method of claim 14, wherein projecting the array of image pixels comprises:
    projecting the array of image pixels onto the surface from the wide-angle lens assembly at the projection angle greater than 180 degrees such that there is a constant angular separation between adjacent projected pixels.

16. The method of claim 14, wherein the surface is a hemispherical surface.

17. The method of claim 16, wherein projecting the array of image pixels comprises:
    projecting the array of image pixels onto hemispherical surfaces of varying radii from the lens assembly at the projection angle greater than 180 degrees.

18. The method of claim 14, further comprising:
    aiming the wide-angle lens assembly at a selectable portion of the surface.

19. The method of claim 14, wherein the surface is the inner surface of a dome.

20. The method of claim 14, wherein optically relaying the array of image pixels comprises optically relaying a first array of image pixels between a first image source and a first wide-angle lens assembly so as to maintain a dispersion in the first array of image pixels at a first intermediate image plane that is substantially the same as a dispersion in the first array of image pixels at the first image source, and wherein projecting the array of image pixels comprises projecting the first array of image pixels onto the surface from the first wide-angle lens assembly at a portion angle greater than 180 degrees, the method further comprising:

optically relaying a second array of image pixels between a second image source and a second wide-angle lens assembly so as to maintain a dispersion in the second array of image pixels at a second intermediate image plane that is substantially the same as a dispersion in the array of image pixels at the second image source; and projecting the second array of image pixels onto the surface from the second wide-angle lens assembly at a projection angle greater than 180 degrees.

21. The method of claim 20, wherein a combination of the first array of image pixels and the second array of image pixels covers a continuous, 360 degree portion of the surface.

22. An optical projection system, comprising:

means for providing an array of image pixels;

means for projecting the array of image pixels onto a surface from a lens assembly at a projection angle greater than 180 degrees, the lens assembly comprising:

a wide angle lens assembly; and an image relay lens assembly that is between the means for providing the array of image pixels and the wide angle lens assembly and is configured to maintain a dispersion in the array of image pixels at an intermediate image plane that is substantially the same as a dispersion in the array of image pixels at the image source.

23. The optical projection system of claim 22, wherein the means for projecting comprises:

means for projecting the array of image pixels onto the surface such that there is a constant angular separation between adjacent projected pixels.

24. The optical projection system of claim 22, wherein the surface is a hemispherical surface.

25. The optical projection system of claim 24, wherein the means for projecting comprises:

means for projecting the array of image pixels onto hemispherical surfaces at varying radii at the projection angle greater than 180 degrees.

26. The optical projection system of claim 22, wherein the image source comprises a cathode ray tube.

27. The optical projection system of claim 22, wherein the image source comprises a field emitter array.

28. The optical projection system of claim 22, wherein the image source comprises a unit selected from the group of units consisting of a digit light processing unit, a liquid crystal display unit, and a liquid crystal on silicon unit.

29. The optical projection system of claim 22, wherein the wide angle lens assembly comprises:

a diffractive optical element that is configured to provide color correction and higher order wavefront shaping.

30. The optical projection system of claim 22, further comprising:

a dome that comprises an inner surface; and wherein the means for projecting comprises means for projecting the array of image pixels onto the inner surface of the dome at a projection angle greater than 180 degrees.

31. The optical projection system of claim 22, further comprising:

means for aiming the array of image pixels at a selectable portion of the surface.

32. An optical projection system, comprising:

means for optically relaying an array of image pixels between an image source and a wide-angle lens assembly so as to maintain a dispersion in the array of image pixels at an intermediate image plane that is substantially the same as a dispersion in the array of image pixels at the image source; and means for projecting the array of image pixels onto a surface from the wide-angle lens assembly at a projection angle greater than 180 degrees.

33. The optical projection system of claim 32, wherein the means for optically relaying the array of image pixels comprises means for optically relaying a first array of image pixels between a first image source and a first wide-angle lens assembly so as to maintain a dispersion in the first array of image pixels at a first intermediate image plane that is substantially the same as a dispersion in the first array of image pixels at the first image source, and wherein the means for projecting the array of image pixels comprises means for projecting the first array of image pixels onto the surface from the first wide-angle lens assembly at a projection angle greater than 180 degrees, the optical projection system further comprising:

means for optically relaying a second array of image pixels between a second image source and a second wide-angle lens assembly so as to maintain a dispersion in the second array of image pixels at a second intermediate image plane that is substantially the same as a dispersion in the array of image pixels at the second image source; and means for projecting the second array of image pixels onto the surface from the second wide-angle lens assembly at a projection angle greater than 180 degrees.

34. The optical projection system of claim 33, wherein a combination of the first array of image pixels and the second array of image pixels covers a continuous, 360 degree portion of the surface.

* * * * *

UNITED STATES PATENT AND TRADEMARK OFFICE
CERTIFICATE OF CORRECTION

PATENT NO. : 6,880,939 B2
DATED : April 19, 2005
INVENTOR(S) : Colucci et al.

It is certified that error appears in the above-identified patent and that said Letters Patent is hereby corrected as shown below:

Column 7,
Line 10, should read -- wide-angle lens assembly at a projection angle greater than 180 --.

Signed and Sealed this

Thirtieth Day of August, 2005

JON W. DUDAS
*Director of the United States Patent and Trademark Office*